United States Patent [19]
Baum

[11] Patent Number: 5,005,974
[45] Date of Patent: Apr. 9, 1991

[54] PROJECTING TESSELLATOR

[76] Inventor: Peter S. Baum, 9 Eustis St., #2R, Cambridge, Mass. 02140

[21] Appl. No.: 454,051

[22] Filed: Dec. 19, 1989

Related U.S. Application Data

[62] Division of Ser. No. 303,956, Jan. 25, 1989, Pat. No. 4,940,309.

[51] Int. Cl.$^5$ .......................... G02B 5/08; G02B 7/18; G02B 27/14
[52] U.S. Cl. ..................... 350/171; 350/612; 350/174
[58] Field of Search ............... 350/612, 613, 626, 627, 350/171, 174, 129, 279, 280, 445, 448, 449, 172, 173; 354/68, 69, 103, 104, 110, 112, 118

[56] References Cited

U.S. PATENT DOCUMENTS

| | | | |
|---|---|---|---|
| 632,573 | 9/1899 | Ives | 354/104 |
| 3,419,329 | 12/1968 | Vogeley | 350/171 |
| 4,367,009 | 1/1983 | Suzki | 350/6.5 |
| 4,487,477 | 12/1984 | Holms | 350/172 |
| 4,531,054 | 7/1985 | Suzuki | 250/201 |
| 4,609,253 | 9/1986 | Perisic | 350/174 |

FOREIGN PATENT DOCUMENTS

| | | | |
|---|---|---|---|
| 0296335 | 12/1986 | Japan | 354/112 |
| 0421100 | 12/1934 | United Kingdom | 350/171 |

Primary Examiner—Bruce Y. Arnold
Assistant Examiner—James Phan

[57] ABSTRACT

A means of creating images, or other whole wavefronts, from composing segments of this whole. The purpose is to allow many, less capable segment generators to be used in place of a single, more capable one. Applications can be found in the design of video projection systems, film projection systems, and photographic enlarging systems. The invention consists of a single focusing means (20), one or more reflective means (24), and a plurality of generators (90 and 92). Representative designs are shown with the following characteristics:
"One-dimensional" tessellation using simple mirrors.
"Two-dimensional" tessellation using glass with mirrored sections.
Extensibility to support an arbitrary number of composing segments.
generating elements placed together on the same plane.
Easy and inexpensive manufacture.
Easy alignment.

10 Claims, 15 Drawing Sheets

PROJECTING TESSELLATOR

This is a division of application Ser. No. 303,956, filed 01/25/89, now U.S. Pat. No. 4,940,309.

BACKGROUND

1. Field of Invention

This invention relates to image generation, image projection, and the creation and use of a plurality of image sub-sections.

2. Discussion of Prior Art

A variety of image generating and sensing devices are widely employed in graphic display terminals, projection video systems, film projectors, photographic enlargers, scanners, and cameras. Sometimes the cost of such imaging systems can be lowered by substituting two or more relatively inexpensive components for a simple, more expensive one. For example, consider a scanning device. If a high resolution CCD (Charge Couple Device) area array is used in a camera, several smaller arrays may be used instead. These smaller arrays can be manufactured with higher yields and therefore at a lower cost. The relationships between yield, defect rate, and cost are made clearer by considering the following example: if there is a 0.5 probability that a $512 \times 512$ device will have at least one defect, then a $2048 \times 2048$ device will have a 0.9999847 probability of having at least one defect, i.e., on the average, only one defect free device will be produced out of 65536 units. If several $512 \times 512$ components can be made to function as a single $2048 \times 2048$ device, the 50% yield on components can be maintained and, perhaps, manufacturing costs significantly decreased.

Projecting devices also have characteristics which lend themselves to the application of this "divide and conquer" strategy. Large cathode ray tubes, for example, are expensive to manufacture because the supporting structure needed to maintain a large vacuum is expensive. Film-based photography represents another opportunity because film transport and development systems become disproportionately expensive as negative area is increased. Bright video projecting tubes are another example.

In order to use multiple imaging components, we must be able to convert an image from or to a plurality of composing image sub-sections. I call this process "tessellation" because the process is similar to creating a mosaic from sub-sections composed of individual porcelain tiles. When an image is projected, a plurality of image sub-sections are combined to form a single entity. When an object is scanned, an image of the object is broken down into a plurality of sub-sections. For the remainder of this document, I will simplify much of the presentation by describing tessellation in terms of projecting systems. The description of a tessellator used as a sensing device is covered in detail within the parent application Ser. No. 303,956 of which this is a divisional application.

Let us consider the physical position of these tessellated sub-sections generated within a projecting system. If the sub-sections are physically adjacent to one another at the point of generation, then the generators must necessarily abut one another. Current technology has been unable to produce buttable LCD displays, CRT's, or similar projecting devices. Therefore, out of necessity, designs have separated the tessellated image sub-sections from one another. This separation can be accomplished in a variety of ways, using for example, multiple lenses or half-silvered mirrors. Heretofore, such systems have been costly, difficult to manufacture, difficult to align, and they have distorted the image in unacceptable ways. The present invention overcomes these disadvantages and thus demonstrates a projecting tessellator that is inexpensive, easy to manufacture, and of a design whose image distortion is easily corrected. Alignment is generally easy to effect, but the means of doing so depends upon specific implementation details and system requirements.

OBJECTS AND ADVANTAGES

Accordingly, I claim the following objects and advantages of the invention: to provide an image tessellating device which is inexpensive, easy to manufacture, easy to align, small in size, light-weight, simple in operation, does not significantly distort the image, is applicable to a large number of image sub-sections, accommodates a wide range of lenses and generator types, and allows the generators to be placed on a relatively small number of different planes.

In addition, such devices in general require no moving parts, function at high speed, and have a long mean time to failure. Often the alignment procedure can be performed quickly and inexpensively. Because some of this alignment can be done using software, alignment can be effected remotely.

Maintenance is simple, and generator replacement may cost less than when a single large generator is used.

Remote generating applications can benefit both from tessellation designs which use generators with different imaging characteristics as well as from the redundancy inherent in using multiple generators. Such redundancy allows for the creation of highly reliable systems.

Further objects and advantages of my invention will become apparent from a consideration of the ensuing description and the accompanying drawings.

Figure 1:
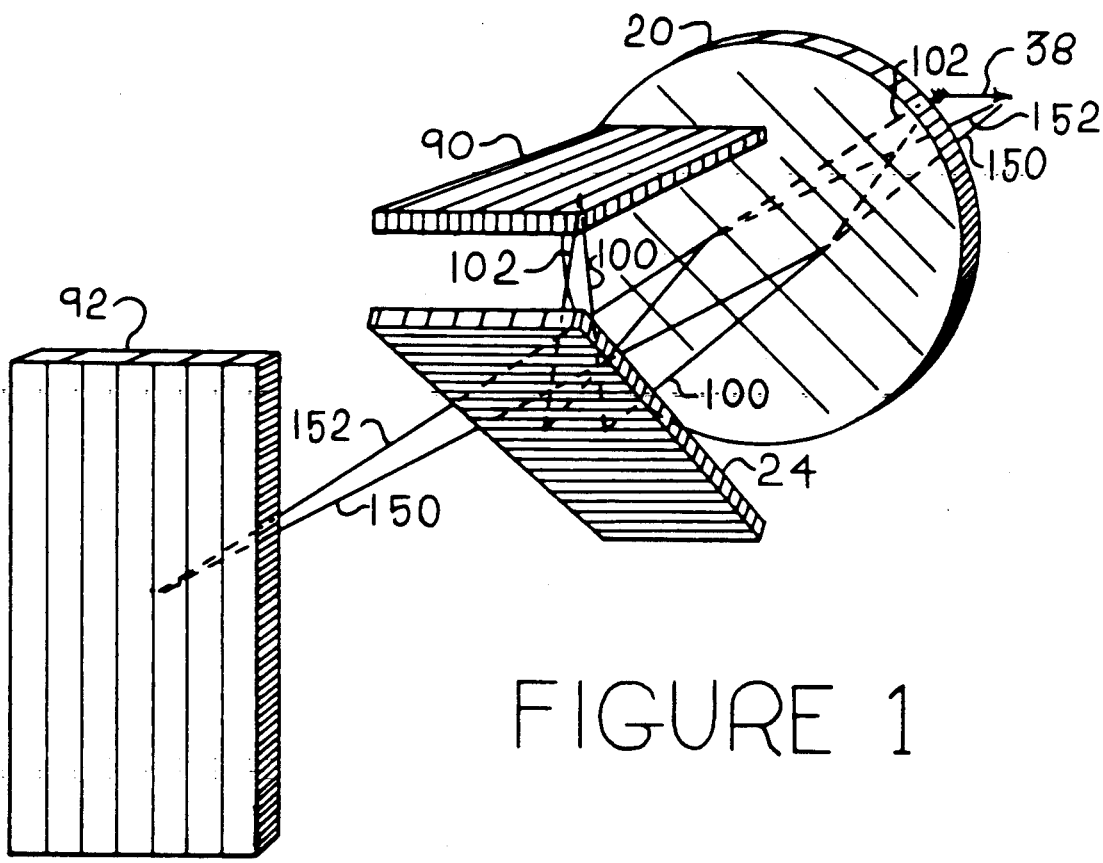
FIG. 1 is a perspective drawing showing the major components of a projecting tessellator.

LIST OF REFERENCE NUMERALS 20 focusing means. A symbolic representation for devices such as a simple lens, a compound lens, a parabolic reflector, a lens and "folding" mirror in combination, or a pinhole lens.

22 transparent supporting structure 24 reflective surface 25 a T1 reflective means. The T1 reflective means of these drawings comprise a plurality of similarly arranged clear means and reflective means. These clear and reflective means are placed adjacent to each other in an alternating pattern within a single plane.

26 protective surface 38 image 40-59 supporting structure for generating elements 60-89 generating elements (each element is associated with a single pixel)

90-99 groups of generating elements (also called generators)

100-199 ray paths 200-210 effective intensity functions

DESCRIPTION OF INVENTION

FIG. 1 shows the major components of a projecting tessellator. The image 38 is ultimately produced by the system and is to be considered as a whole entity. A means of focusing rays is schematically represented by the circular solid 20. Although suggestive of a simple lens, it might, in fact, represent a compound lens, a lens in combination with one or more "bending" or "folding" mirrors, a pinhole lens, a parabolic mirror, or any number of other similar devices. A means of altering the path of one or more rays for example, by reflection, is represented by the rectangular solid 24. An example of such a reflective means would be a simple mirror. A means of generating electromagnetic radiation is represented by rectangular solids 90 and 92. Examples include cathode ray tubes, liquid crystal display chips, and photographic film in conjunction with a light source. It is possible to imagine images of sub-sections of the object being projected through such a system. The path taken by each such image can be represented by a set of ray paths. One such set comprises ray 100 and ray 102. Another comprises ray 150 and ray 152.

Figure 2:
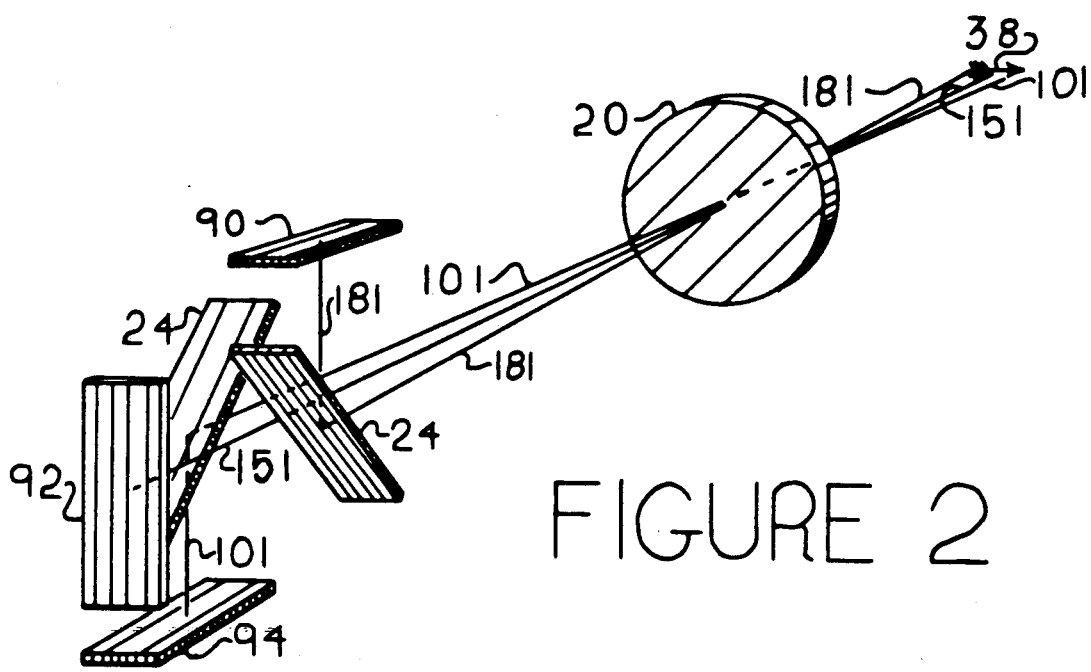
FIG. 2 is a perspective drawing showing how additional generators might be added for increased resolution.

FIG. 2 shows that additional reflective means and generating elements can be added if more image sub-sections are required. Here a single ray is used to suggest the path taken by a sub-section as it travels from a generating means to image 38. Ray 181 suggests the path taken by a sub-section which includes the tail of the arrow and ray 101 the path taken by a sub-section which includes the head of the arrow. FIGS. 3, 6, 7, 8, 9, 13, 14, and 15 give additional configuration possibilities and suggest still others. The choice of a specific design depends upon a number of factors including device size, generator dimensions, characteristics of the focusing means, and required image resolution. The effect of these factors on the design will be better understood after reading the following section.

OPERATION OF INVENTION

FIG. 1 shows major components of a tessellator. Image 38 represents a whole entity. In a projecting tessellator, it is the whole image that is being created from component image sub-section. Such sub-sections are also called segments or tiles. This application covers the use of a tessellator as an image generation device. The use of tessellators as sensing devices is covered in the parent application Ser. No. 303,956 which this is a divisional application.

To make explicit the terminology being used: sub-sections of an object are called object sub-sections. In projecting tessellators, object sub-sections are produced by generating means. Images of object sub-sections are simply called sub-sections. When sub-sections are focused to form a distant projected image, for example, on a motion picture screen, they are called image sub-sections. Image sub-sections thus combine to form a projected image.

Object sub-sections are produced by generating means 90, and 92. The object sub-section from generator 90 travels along ray paths 100 and 102, is reflected by reflective means 24, and travels to the focusing means 20. The segment which travels from generator 92 along ray paths 150 and 152 continues along an unreflected path to focusing means 20. This focusing means might be a pinhole lens, a simple camera lens, a compound lens, a lens in combination with one or more "bending" or "folding" mirrors, a parabolic reflector, or other means of focusing electromagnetic radiation. (If the focusing means were a parabolic reflector, the figure would have to be slightly modified.)

Segments travel from focusing means 20 along ray paths to image 38. The focusing means 20 focuses rays from the object sub-sections to form image 38. In this way, sub-sections produced by generators 90 and 92 are combined to form a complete image. Characteristics of the focusing means, such as focal length, determine the position of generators 90 and 92 and the position of image 38.

FIG. 2 shows how additional generators might be added if the image is to be broken into more than two segments. In this case, each of three segments is directed along three distinct paths. These paths are represented by chief rays 101, 151, and 181. The segment which originates from generator 94 and travels along path 101 is directed to focusing means 20 by reflective means 24. Similarly, the segment which travels along path 181 originates from generator 90 and is reflected toward focusing means 20 by a reflective means 24. The segment which travels from generator 92 along path 151 travels unreflected to the focusing means. The size, shape, and position of the generators and reflectors can vary widely. Furthermore, some tessellators may use movable mirrors to allow segments to by directed from more than one generator.

Figure 3:
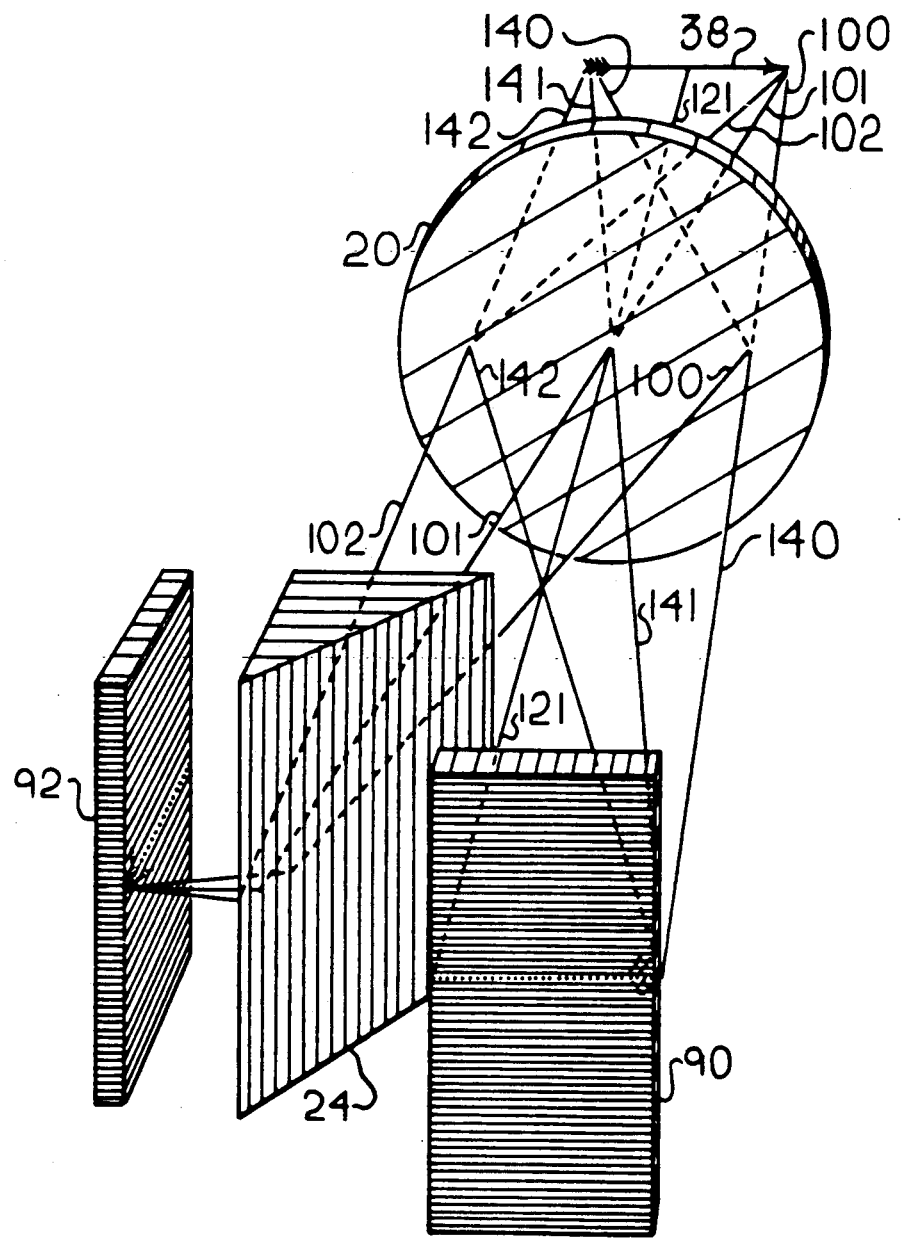
FIG. 3 is a perspective drawing showing an alternative reflective means being used in a simple tessellator.

FIG. 3 shows a flint glass prism reflective means 24 directing segments from generator 92. Both generators intersect the plane containing ray paths 100, 101, 102, 121, 140, 141, and 142. Note how this differs from FIG. 2 which places generators 90 and 94 out of the plane which contains the parts of the ray paths of 101, 151, and 181, which are between the focusing means 20 and the reflective means 24.

In FIG. 3, the head of arrow 38 is formed at the intersection of ray paths 100, 101, and 102 by focusing means 20. These rays originated from a point on generating means 92 and were reflected toward focusing means 20 by reflective means 24. An image of the tail of arrow 38 is formed at the intersection of ray paths 140, 141, and 142 by focusing means 20. These rays originated from a point on generating means 90. Ray path 121 shows another part of the object produced by generator 90 being directed by focusing means 20 to form another part of image 38.

Figure 4:
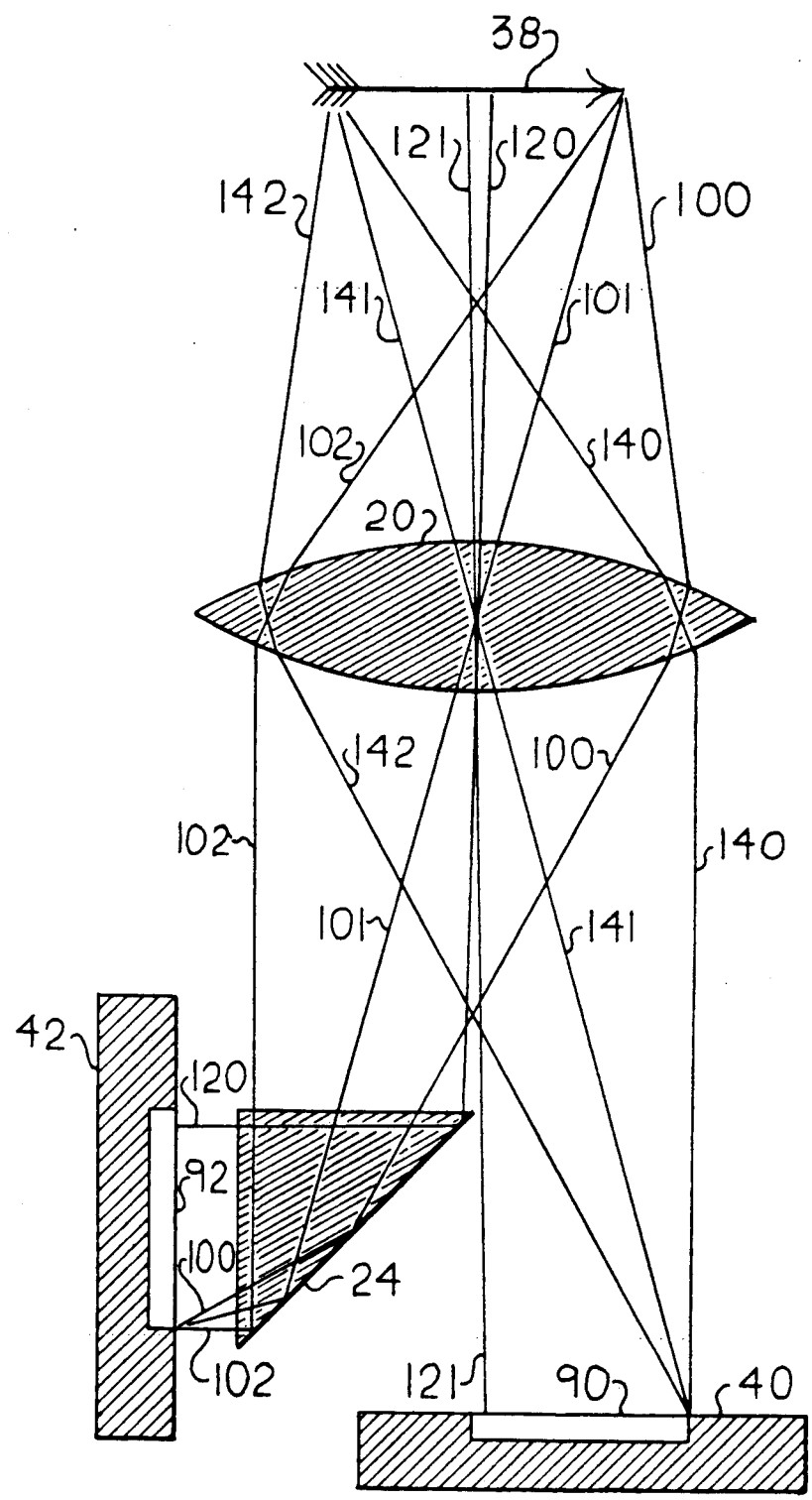
FIG. 4 is a top view of FIG. 3.

FIG. 4 is essentially a top view of FIG. 3. A few additional details have been added. First, generators 90 and 92 are shown embedded in supporting structures 40 and 42 respectively. These supporting structures represent the physical mass of the generating device which prevents two generators from being abutted. Also added in FIG. 4 is ray 120, one of the paths taken from generator 92. This ray is directed by reflective means 24 to focusing means 20 and thereby made to contribute to the formation of image 38.

In FIG. 4, each chief ray which is to contribute to image 38 between rays 120 and 121 will originate from either generator 90 or generator 92. If no such ray originates from a generator, it will not be possible to properly form the image. For the proper formation of these rays, the position, size, and shape of reflective means 24 is critical. In particular, a beveled edge on reflective means 24 may prevent the proper passing or reflection of rays to image 38. Thus such an edge represents a potential source of unacceptable image distortion.

Figure 5:
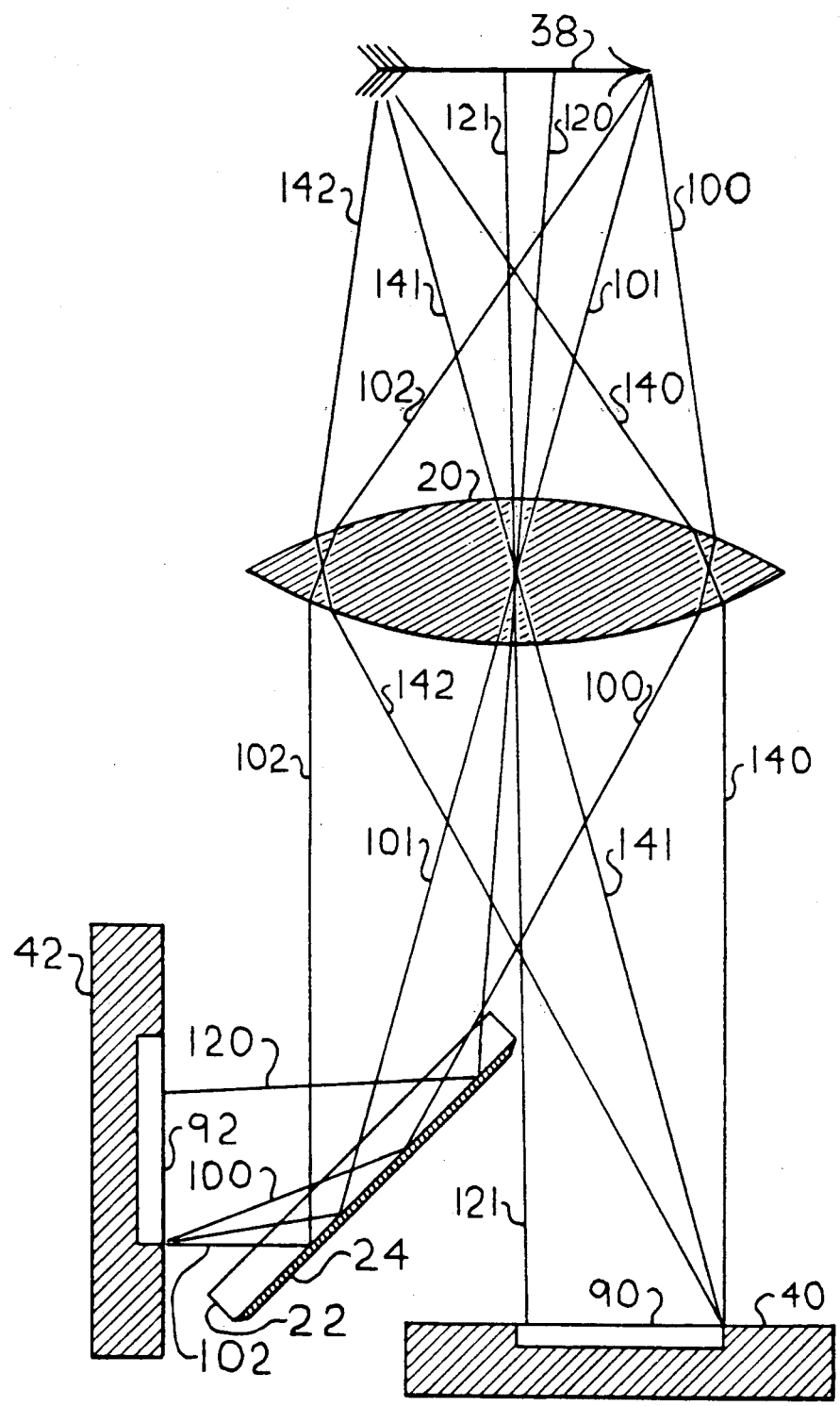
FIG. 5 is a top view showing a problem brought about when a simple mirror is used for the reflective means.

FIG. 5 shows the problem when a simple mirror is used as a reflective means. The mirror comprises a transparent glass supporting structure 22 and a metallic reflective surface 24. As in FIG. 4, some of the chief rays between rays 120 and 121 are likely to be improperly formed. In particular, the edge of transparent supporting structure 22 closest to the focusing means 20 (of which only one point is visible in the drawing) is likely to cause problems. Also the narrow side of the transparent supporting structure 22 closest to the focusing means 20 (the length of which represents the thickness of the mirror) is likely to cause significant distortion unless carefully finished. These difficulties are overcome in FIG. 6 which shows supporting glass 22 of a simple, back-coated mirror extending into an area through which rays 121 and 140 pass. Note that reflective means 24 is NOT extended into this area.

Figure 7:
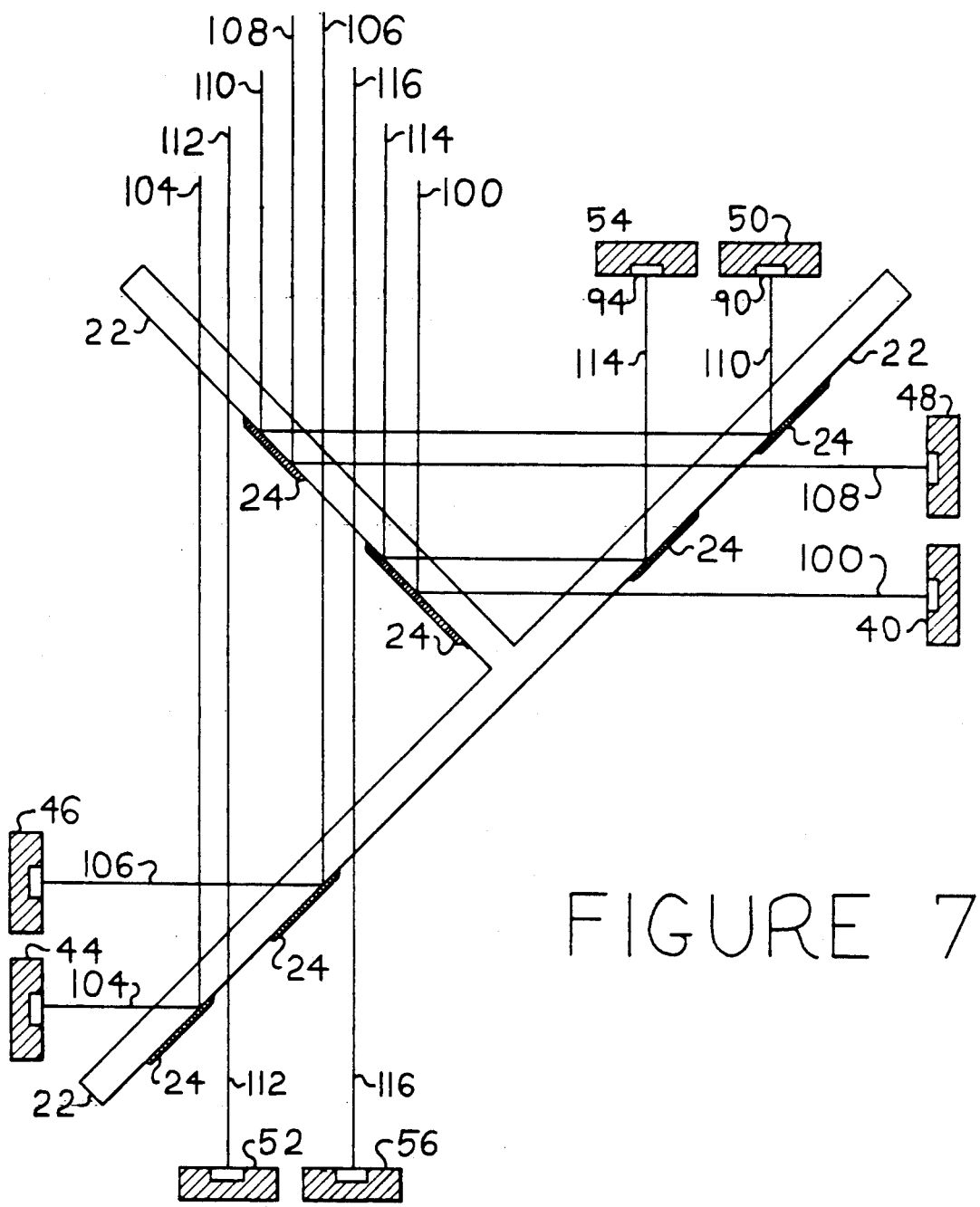
FIG. 7 is a top view showing a configuration which reduced the number of planes on which the generators are placed and does not require the generators to abut.

Designs using clear and mirrored sections of glass are often favored because, as will be seen, they allow generators to be supported on a single plane such as a circuit board. FIG. 7 shows 8 rays from 8 individual generators being directed toward a distant focusing means (not shown in the drawing). Rays 112 and 116 show how a segment might travel directly from a generator. Rays 104, 106, 100, and 108 show how segments might each be directed to a focusing means after a single reflection. Rays 110 and 114 show how segments might be directed to a focusing means after 2 reflections.

Figure 6:
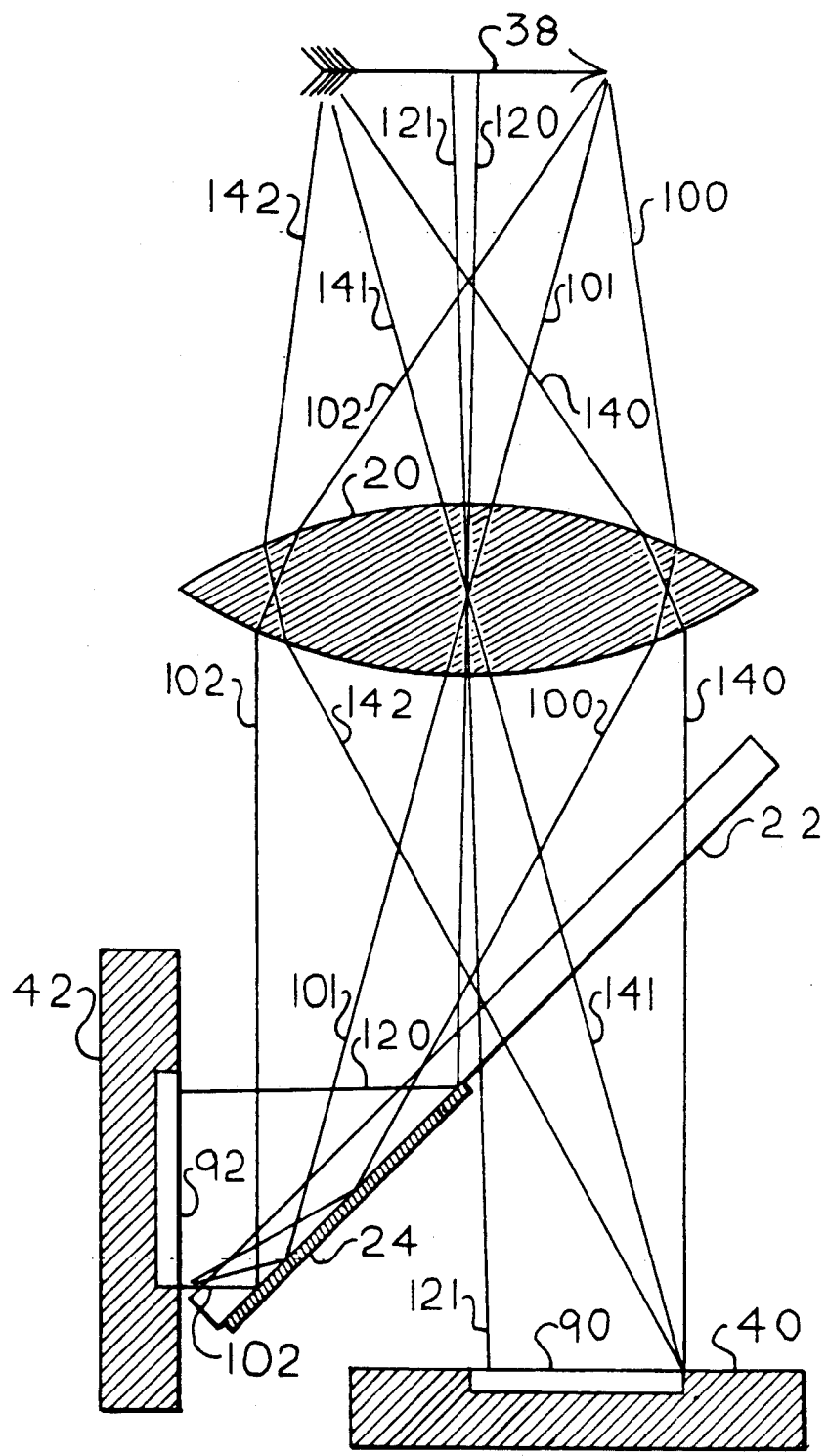
FIG. 6 is a top view showing how the problem introduced in FIG. 5 can be overcome.
Figure 8:
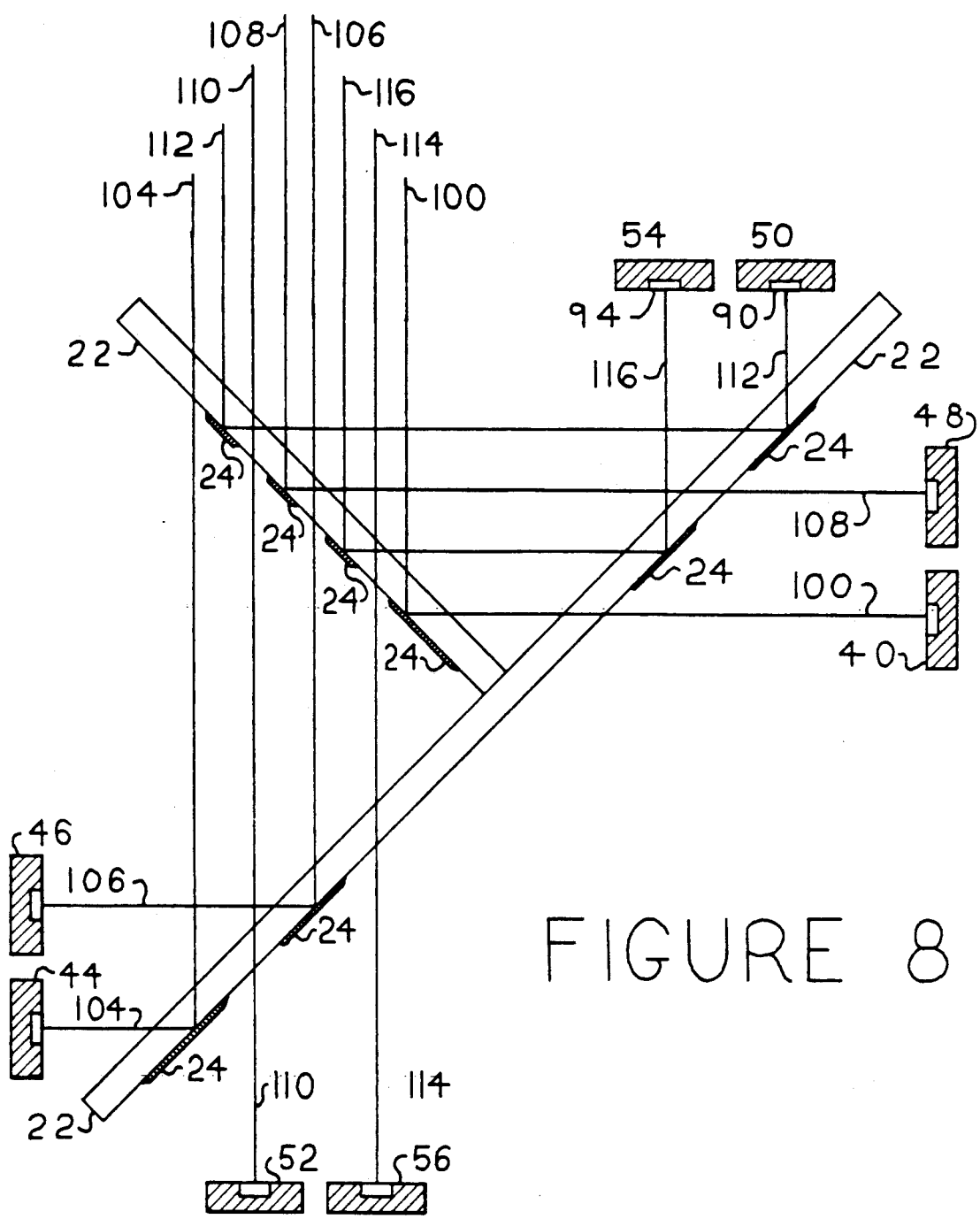
FIG. 8 shows an alternative design with the same property as the design shown in FIG. 7.

FIG. 7 demonstrates two important extensions to the ideas presented in FIG. 6. First, it shows that the design of FIG. 6 can be extended to tessellate the image into more than two image segments. Second, it shows how to arrange reflective means so that groups of generators lie in the same plane (in addition to lying in same plane as the paper). Looking at generator supporting structures 50 and 54, we see that they are placed side by side and that their associated generators 90 and 94 are separated by the distance required to accommodate rays 106, 108, and 116. This is because these rays are positioned between rays 110 and 114 which in turn determine the position of generators 90 and 94. The design of FIG. 7 allows the distance between generators to be greater than the length of the generator supporting structure. When generators must be kept separated, for example, because each one is physically surrounded by extensive supporting material, a design which pairs sub-sections "separated" by two or more sub-sections can be used. Furthermore, it is possible to do this in such a way that each pair of generators are in the same plane. There is a wide range of design alternatives and extensions involving the number of reflections and the size, shape, and position of clear and reflective surfaces. FIG. 8 shows that the last reflections need not be of adjacent pairs of segments.

Figure 9:
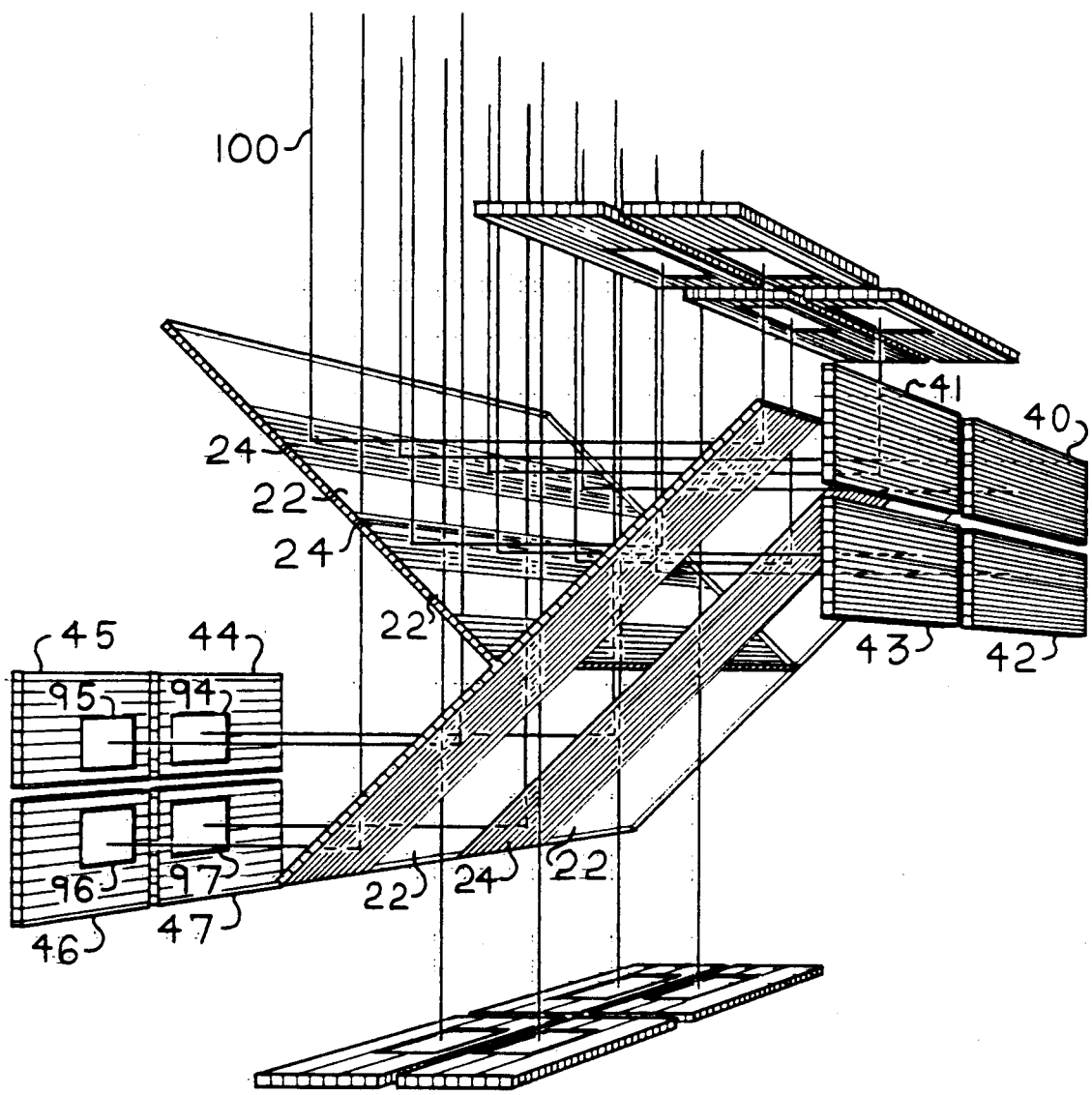
FIG. 9 is a perspective drawing of a design which effects two dimensional tessellation.

FIG. 9 shows how these ideas can be extended to two dimensional tessellation. Two dimensional tessellation takes place when the image sub-sections form a two dimensional pattern of two dimensional sub-sections rather than a linear, one dimensional pattern of one or two dimensional sub-sections. Note that, by this definition, one dimensional tessellators can generate static two dimensional images if the generators are area generators.

In FIG. 9, four separate groups of four coplanar generators and their support structures produce 16 object sub-sections. Generator supporting structures 40, 41, 42, and 43 form one coplanar group. Structures 44, 45, 46, and 47 form another. Notice that the focusing, reflective, and transparent supporting means restrict the positions of the generators such as 94, 95, 96, and 97 but that the supporting structures 44, 45, 46, and 47 are not as limited. In particular, each supporting structure in this particular design, has one or two sides which can be easily extended to contain additional generator support circuitry. A ray from each of the 16 generators is shown to pass through and/or be reflected by one or more clear means 22 and reflective means 24. The result is a 4-by-4 pattern of rays being directed toward a distant focusing means (not shown in the drawing). The purpose of the focusing means is to form a distant image (also not shown in the drawing) from a 4-by-4 pattern of sub-sections.

Figure 10:
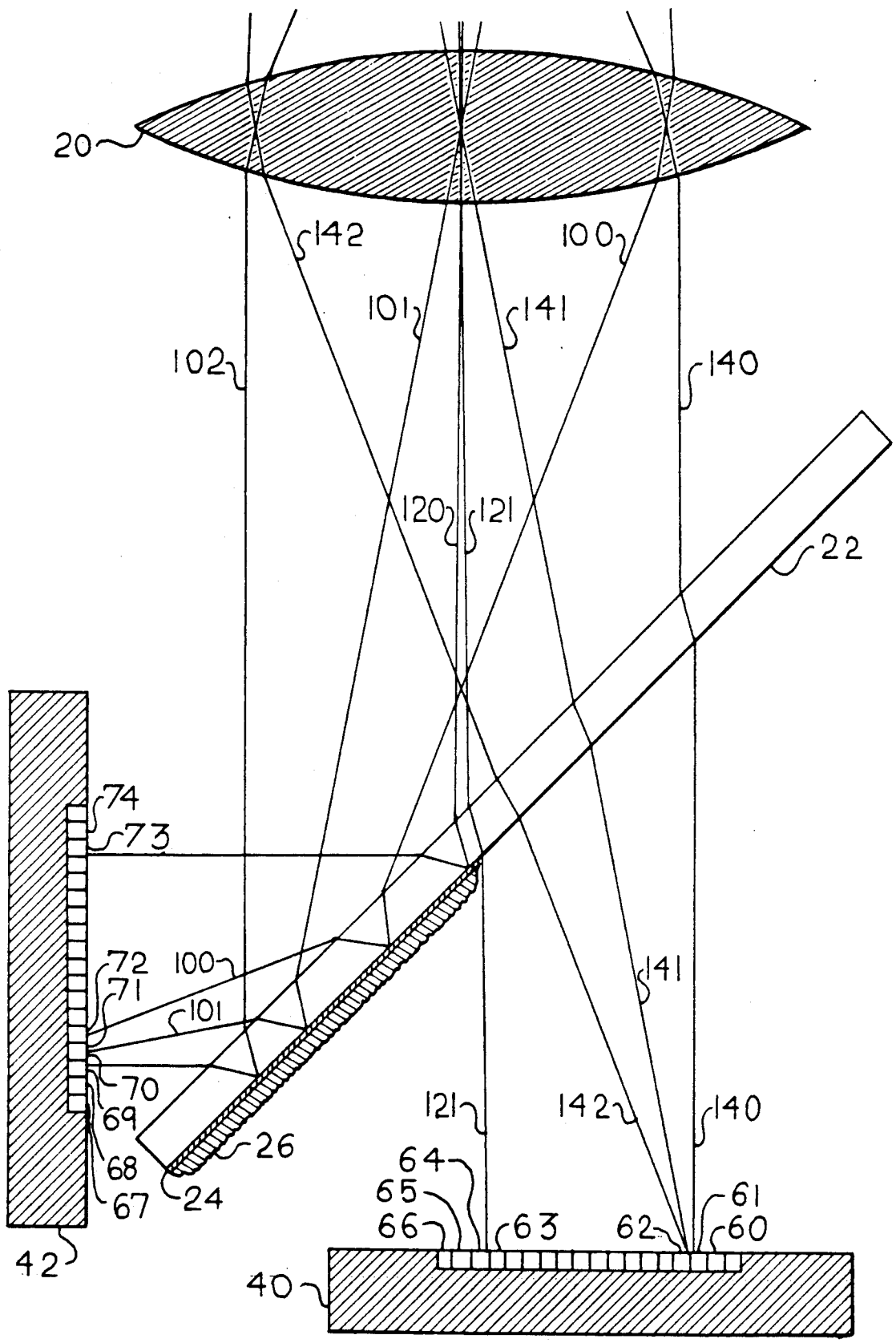
FIG. 10 is a top view giving more details concerning the transparent surface, the protective surface, and alignment.

FIG. 10 shows more structural details of the design previously shown in FIG. 6. The drawing is not to scale. In particular, the reflective surface 24 is usually very thin. The protective surface 26 is usually thicker than the reflective surface 24 but is still quite thin — typically the thickness of a coat of paint. The thickness of transparent surface 22 is typically of the order of 2 millimeters. Here the implication is that rays 120 and 121 are separated by the width of a fraction of a pixel so distortion after image reconstruction is inconsequential. The figure also shows the importance of carefully controlling the position and dimensions of the protective means 26 since it is typically much thicker than reflective means 24.

Also shown in FIG. 10 is refraction within the transparent supporting means 22. Given a fixed projected image, this refraction slightly alters the position of the generators from the position that would be required if no transparent means were present. The exact position is a function of the transparent supporting means's thickness and the refractive index. With these characteristics as drawn, rays 140, 141, and 142 (assumed to eventually converge at a single image point) are shown not to originate from a single generator element. Similarly, rays 100, 101, and 102 are shown not to converge. Also, because a symmetric bi-convex lens is shown as the focusing means, other aberrations will be apparent if accurate ray traces are made. Such aberrations can be minimized using classical optical design techniques. Under some circumstances, first-surface mirrors may be used to advantage.

Assume for a moment that rays 121 and 140 in FIG. 10 delimit the portion of the image segment which is to be produced by the generators supported by the supporting structure 40. Similarly, assume rays 120 and 102 delimit the portion of the image segment to be produced by the generators supported by structure 42. In particular, we see ray 140 is produced by generating element 61, ray 121 by generating element 64, ray 120 by generating element 73, and ray 102 by generating element 69. Note, however, that these generating elements are not the end elements and that generating elements 60, 65, 66, 67, 68, and 74 (among others) are not used.

In this particular design, the exact position of rays 120 and 121 are assumed unknown because of variations in the position of reflective means 24. This design allows for the dynamic alignment of the device. In other words, generating elements are wasted and the image constructed by making the pixels that correspond to generating elements 64 and 73 be either adjacent or joined as components of a single pixel of the final composite image.

Figure 11:
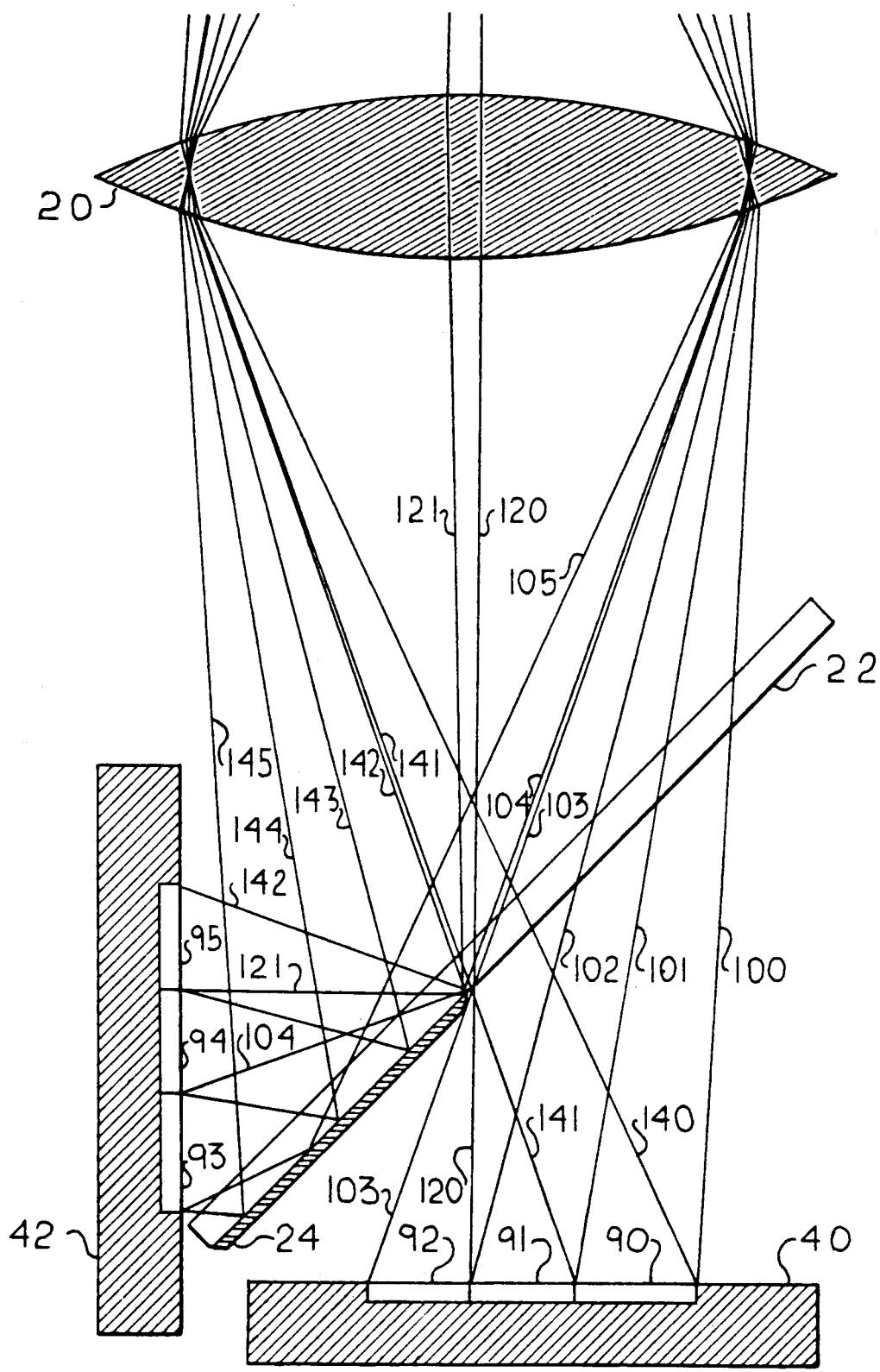
FIG. 11 is a top view used to describe an important type of image distortion occurring during the operation of some tessellators.

The previous descriptions have ignored details of the effect of placing the reflective means within the area used to gather together object sub-sections. FIG. 11 can be used to analyze the effect of doing so. In this drawing, a simple optical lens 20 is used as a focusing means. The drawing has been simplified by assuming there is no refraction by transparent supporting structure 22.

Consider rays 101 and 141. Both are generated at a single point on the object plane where the two rays intersect. Similarly, all the points within generator area 90 generate rays which pass through every point of the lens. Generator 93 also produces all of the rays directed to every point of the lens but via a reflection from reflective means 24. We see, however, that generator areas 91 and 92 produce some rays which reach focusing means 20, while others are blocked by the reflective means 24.

There are an infinite number of rays generated by the point where rays 102 and 120 intersect which reach the focusing means 20 between the intersection of the surface (nearest generator 91) of focusing means 20 and ray 102, and the intersection of the surface (nearest generator 91) of focusing means 20 and ray 120. Similarly rays generated at the intersection of 121 and 143 reach the focusing means between the intersection of the surface of focusing means 20 and ray 121 and the intersection of the surface of focusing means 20 and ray 143, which would have been reached by rays from the intersection of 120 and 141 were the reflective means 24 not present. Similarly, rays 103 and 144 contribute to the same point on the image and yet originate from different generators. Thus the object sub-section formed by generator 91 is seen to be the same as that formed by generator 95. Similarly, generator 94 needs to produce a duplicate of the image formed by generator 92. We speak of the object sub-sections formed by the generators of structure 40 as "overlapping" or "duplicating" the object sub-sections formed by the generators of structure 42. One may also observe that generator 91 contributes rays which cover a larger area of focusing means 20 than generator 95, and the rays of generator 94 cover more than those from generator 92. Because of this, there is a greater intensity contribution made to the projected image by generators 91 and 94 than contributed by generators 95 and 92.

Areas 91, 92, 94, and 95 will usually be the same size. Their size relative to areas 90 and 93, however, will be determined by lens size (effective aperture), lens focal length, placement of the reflective means, and the required image area.

Notice in FIG. 11 that, relative to focusing means 20 and a fixed projected image (not shown in the figure), the position of generators 90, 91, and 92 are fixed. We can, however, more reflective means 24 closer to focusing means 20 than is shown in the figure. Assume the 45-degree angle that reflective means 24 makes with the generating surfaces is kept unchanged in the process. As reflective means 24 is moved along the optical axis of, and closer to, the focusing means 20, generator area 91 increases and generator area 90 decreases. The sum of these two areas remains constant. In addition, area 92 increases, and it is this increase which increases the total required generator area. For the specific design shown in FIG. 11, when a portion of the reflective means 24 first reaches the intersection of rays 140 and 105, the size of generator area 90 goes to zero. At this point, if we appropriately increase generator area 92, then the generators of support structure 40 generate the entire image. In such a position, reflective means 24 is said to be at the minimum tessellating distance. This distance is defined as the distance beyond which the reflective means, or portions thereof, must be placed from the central optical plane of the focusing means in order that there be at least one individual generating means, i.e., set of adjacent generating elements, that generates less than the entire area of the image. Furthermore, this condition must be a result of the position of the reflective means therein and not the result of a limited generator area. A similar analysis of generators 93, 94, and 95 will yield similar results and the same minimum tessellating distance. However, these generators must be repositioned when reflective means 24 is moved to properly direct rays to focusing means 20.

Suppose that each object point is focused as an image on some surface and no reflective means is present. For each image point, assign as the absolute value of the intensity of the corresponding object point, an intensity value of 1.0. If we ignore intensity losses from the focusing means and reflective means, this intensity value is the same as the value at the image. Thus with reflective means 24 present and in the position shown in FIG. 11, object sub-sections of intensity 1.0 produced by generator areas 90 and 93 result in image sub-sections with the same intensity. Object sub-sections created by generator areas 91, 92, 94, and 95 each have an object sub-section intensity of 1.0 and the resulting image sub-section intensity will also be 1.0. This is true even though the image sub-sections are the result of "adding" sub-sections of the overlapping areas. This is because the reflective means prevents some of the rays from the generators of these overlapping sub-sections from reaching the focusing means. This effectively decreases the intensity from each generator to a value less than 1. We call this value the "effective intensity value" for that object point.

As we move reflective means 24 closer to the focusing means 20, the image intensity contribution from each of the generators becomes more even. When the reflective means 24 is placed against the focusing means 20, there is an effective object intensity of 0.5 produced by all parts of all generators. We have effectively split the focusing means 20 into two smaller focusing means. Such a design is equivalent to using a half-silvered mirror which also produced two full-size, half-intensity images. Although such systems can generate images at high resolution, the decreased image intensity is a distinct disadvantage. In contrast, the tessellator designs of this application do not suffer from this defect. Instead, one full intensity image is generated by two or more generators. However, the maximum resolution is obtained when generator areas 90 and 93 are made as large as possible and areas 91, 92, 94 and 95 are made as small as possible. This condition occurs when the reflective means 24 is as close to generator supporting structure 40 as is possible (while still maintaining the 45-degree angle with the generator surfaces and while still maintaining a position which reflects the rays from generators 93, 94, and 95 toward reflective means 24 between rays 142 and 145 as shown). In other words, maximum resolution of the system occurs when the reflective means 24 is as far from the focusing means 20 as is possible. In such a position, there is minimal object sub-section overlap. As mentioned above, with the reflective means in this position, there is usually observable image distortion in the form of an effective intensity value of less than 1.0 for each generator. However, this "distortion" is of little practical consequence, as explained shortly.

Figure 12:
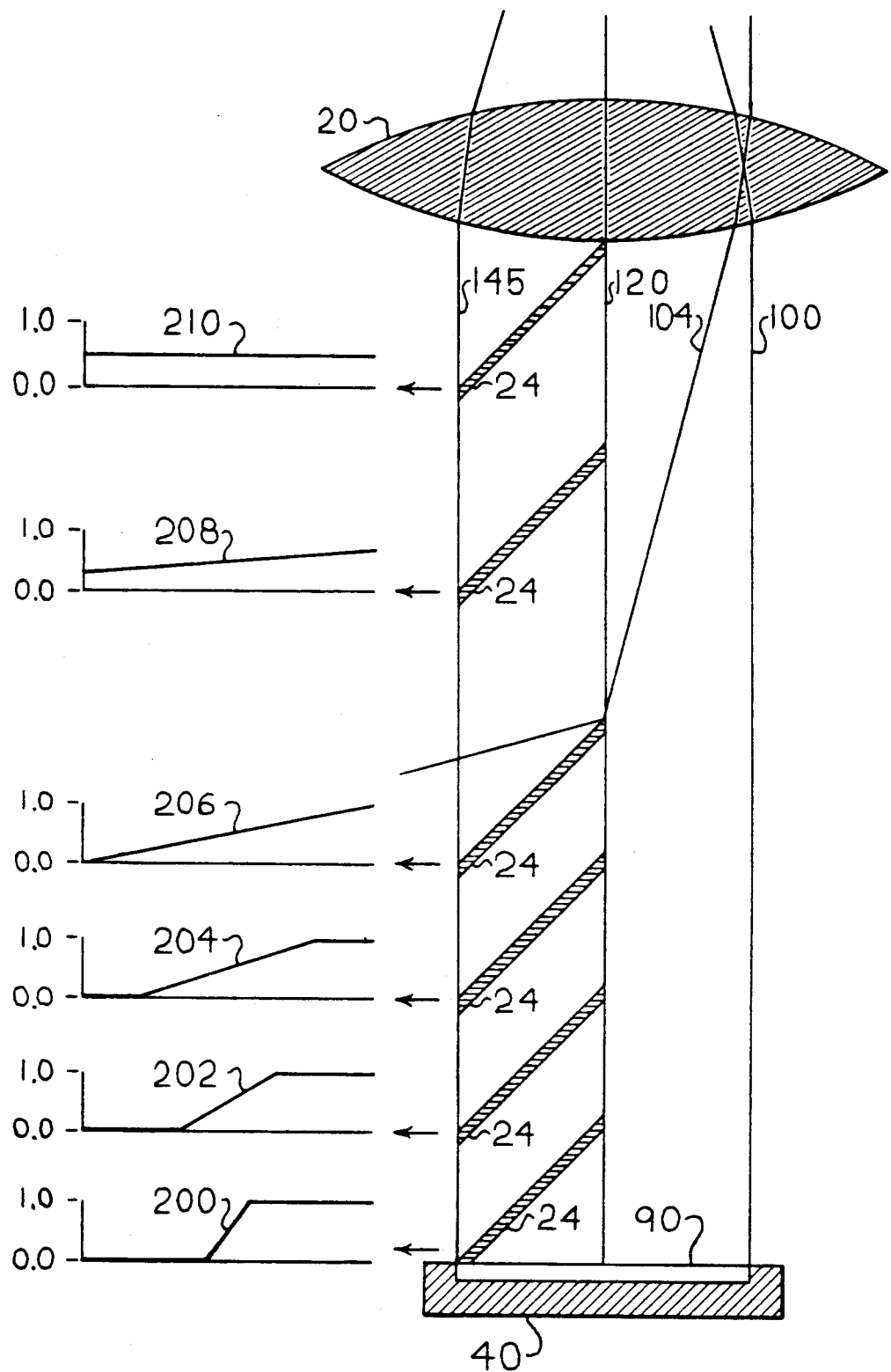
FIG. 12 is a top view of part of a simple tessellator. It shows the effective intensity functions that result when a reflective means is placed in various positions.

FIG. 12 shows more precisely the nature of the effective intensity variations as a function of the position of the reflective means. In that figure, it is to be understood that a complete tessellator would require the additional generator supporting structure 42 and associated generators shown in FIG. 11. The intensity graphs shown use the ordinate to represent effective intensity. A value of 1.0 is the intensity value of the image produced if no reflective means were present. The value of 0.0 indicates no rays reach the focusing means. Intermediate values are directly proportional to the area of the lens which receives rays from a given generated object point. The abscissa of each intensity graph gives the position across a potential generator area of supporting structure 40.

Intensity function 200 results when the reflective means 24 is placed as close to generator 90 as possible (given the previously explained conditions). All the intensity function values which are greater than 0.0 and less than 1.0 represent points of the image which are produced by more than one generator, since we assume in this case that generators are used to exactly span the non-zero values shown in the graph. We will refer to these points on the graph as being "overlapping image points," or simply "overlapping points," since their position corresponds to image points which are produced by more than one generator. To reconstruct an image, every non-zero effective intensity value is produced. The generator values for overlapping image points are "added" by the tessellator in the process of creating the final projected image intensity value of 1.0. The only requirement is to create these "overlapping" image points with some of the generating elements.

Usually the intensity values of each point of each generator are created at a 1.0 intensity. However, it is possible to decrease the intensity of one of the generators or even eliminate that generator altogether. For example, one could eliminate generator areas 92 and 95 in FIG. 11. Doing so requires that the remaining generator produce overlapping object sub-sections with an intensity greater than 1.0. The required intensity for such a generator is inversely proportional to the area of the focusing means 20 reached by rays from that point and can be determined from the intensity graphs shown in FIG. 12. (Here we are ignoring the technicality that the generator's intensity must have linear characteristics.) There are many ways of creating the required generator values from knowledge of the effective intensity fall-off characteristics. These include, but are not limited to, the following: analog pixel intensity amplification, digital pixel intensity value modification, and various photographic processes. In practice, generators typically would not be eliminated because the designer would not wish to trade off image intensity for increased resolution.

In FIG. 12, the assumption is made that the intensity of rays contributing to the formation of each point of the image is the same for each position along the face of the focusing means 20. This allows us to draw the line segment representing the overlapping points as a straight line segment. If this assumption is false, the curves for the overlapping points are more complex, but the results are essentially the same. The effective intensity function for the generator not shown in FIG. 12 (but shown in FIG. 11) would be function 200 reflected about the line with equation $Y = 0.5$. In other words, the equation for this function is $1.0 - G(x)$ is the equation for function 200. Adding such a function with function 200 results in a constant function $F(x) = 1.0$. Thus all of the resulting intensity values are properly constructed.

As the reflective means 24 is moved closer to focusing means 20, the section of the function representing overlapping points covers a greater length along the abscissa and has less of a slope. Function 206 shows effective intensity values present when the reflective means is placed at the minimum tessellating distance. That position occurs when the edge of reflective means 24 closest to the focusing means 20 is at the intersection of rays 120 and 104. Note that function 206 shows a non-zero intensity for generator 90 across virtually its entire face. This is because in this position generator 90 must create the entire image. As reflective means 24 is moved still closer to the focusing means 20, the entire image continues to be created but the effective intensity variation is less. Function 208 shows this situation for one such position.

Finally, function 210 shows the results of placing the reflective means as close to the focusing means 20 as possible. Here again, the entire image is created but at an effective value of 0.5 since only half of the focusing means is used to produce the projected image. Note that in every position of the reflective means, adding the effective intensity values of each generating element that contributes to the same point on the image will result in an image intensity value of 1.0. However, once the reflective means 24 is closer to the focusing means 20 than the minimum tessellating distance, the entire object is created by both generators. If, under such circumstances, we choose to use only one generator to create the image, this resulting image will have a decreased intensity. Having two generators each create an image at half-intensity is not generally a useful tessellator design, since the less expensive alternative of using a single generator with no reflective means produces the same result.

On the other hand, moving the reflective means as close to the sensing means as possible has two desirable effects. First, the generator size required by the design is decreased. Given a fixed generator size, this is equivalent to increasing the available resolution of the tessellator. Second, the number of overlapping pixels which become "added" together to produce the proper intensity levels is decreased. In some cases this decreases the time required to produce a complete image.

Figure 13:
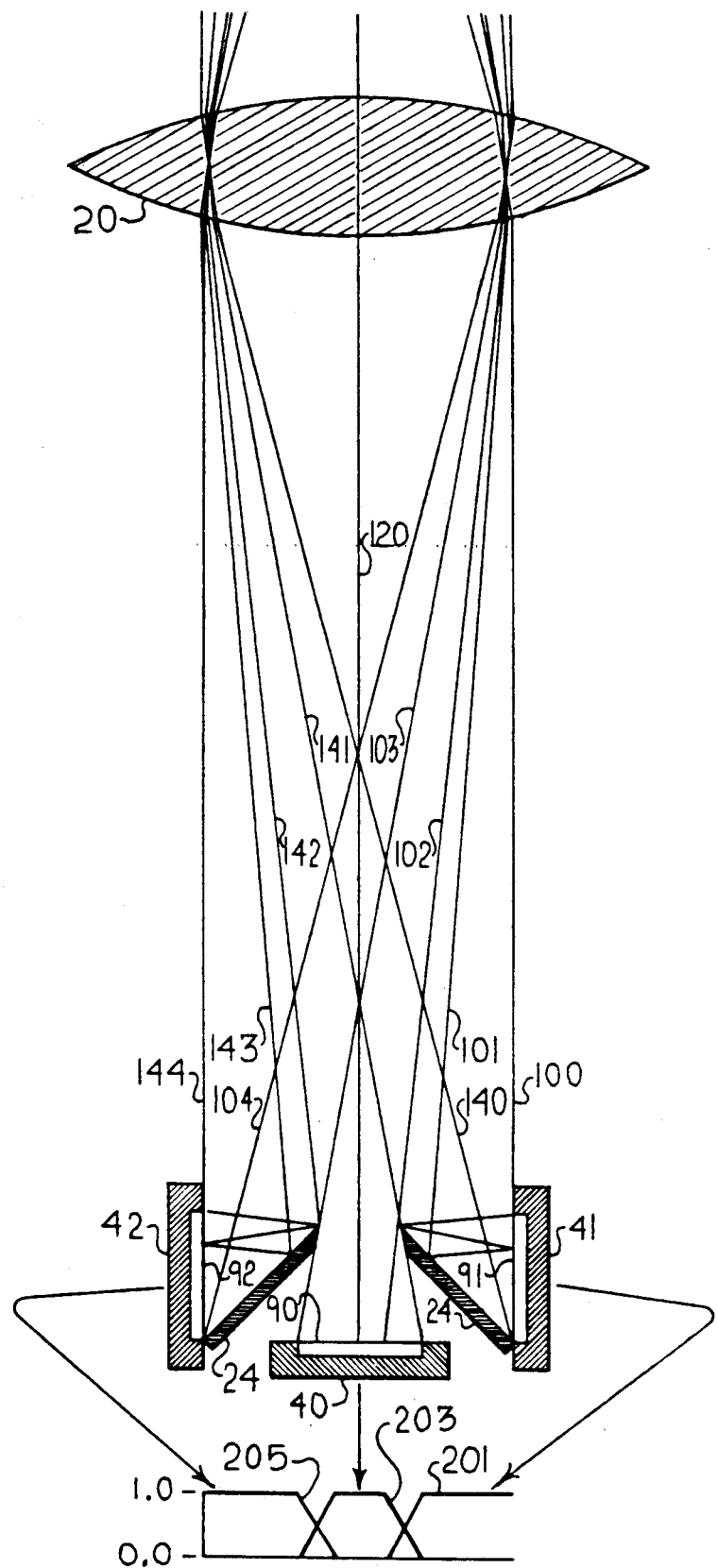
FIG. 13 is a top view of a tessellator constructed with two reflective means. Also shown is a graph of three intensity functions.

Because moving the reflective means closer to the generators is so advantageous, the following question naturally arises: is it also advantageous to use a greater number of smaller reflective means, since they can be placed closer to the sensing means? For example, is it better to use the design of FIG. 13 rather than that of FIG. 11? An examination of FIG. 13 shows that the answer to this question is complex. Here we have decreased the size of the reflective means 24 and tessellated the image in such a way that 3 generators of equal size can be used. Effective intensity function 201 is for generator 91. Similarly, effective intensity function 203 and 205 are for generators 90 and 92 respectively. The minimum required generator sizes can be determined by examining the domain corresponding to non-zero function values of each of the three functions. The reflective means 24 have been positioned so that the minimum generator size is the same for all three generators. This minimum generator size is smaller than that required in the design of FIG. 12 as can be determined from an examination of function 200 in FIG. 12. Of course, the design of FIG. 12 requires only two generators while that of FIG. 13 requires three. The image produced by the tessellator in FIG. 13 (which is not shown) is properly reconstruct because the tessellator "adds" the overlapping points of function 201 to the corresponding points of function 203. The number of such pixels is less than the number required in function 200 of FIG. 12. A similar result will be obtained for the overlapping points of function 205 and 203. This means that, for each pair of generators, there are fewer pixels to duplicate in FIG. 13 than in FIG. 12. However, the total number of overlapping pixels in function 203 is greater than the total number of overlapping pixels in function 200 of FIG. 12. This means that the total number of pixels that must be duplicated is greater in FIG. 13 than in FIG. 12. It is seen, therefore, that when trying to determine the performance and cost of alternative tessellator designs, a complex interaction of factors may arise which involve the number of generators, generator size, generator cost, generator resolution, tessellator resolution, image intensity, image overlap, and reflective means placement. However, given a fixed number of generators, it is generally advantageous to place the reflective means as close to those generators as possible.

Figure 14:
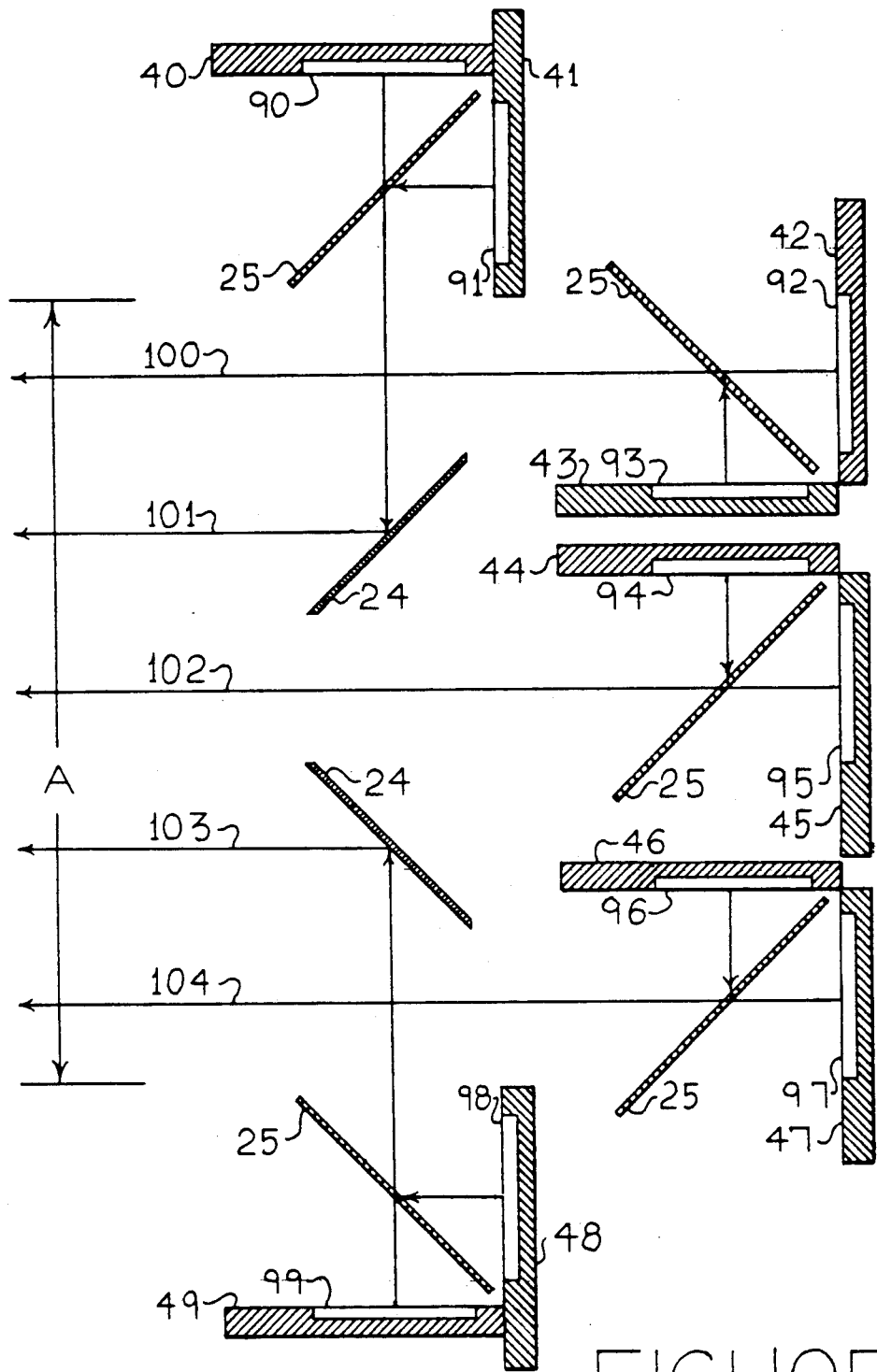
FIG. 14 is a top view of part of a 5×N tessellator.

Although FIG. 9 shows how to effect two-dimensional tessellation, the design has the disadvantage of keeping the reflective means relatively distant from the generators. Note in particular, the position of the second reflective means 24 which reflects ray 100 as it proceeds outward from the generator. As explained in the previous paragraph, given a fixed number of generators, the inability to move this reflective means closer to the generators decreases available tessellator resolution. FIG. 14 shows how the reflective means can be positioned so as to increase the system's resolution. In FIG. 14, 5 image segments represented by rays 100, 101, 102, 103, and 104 exit to the left of the diagram toward a focusing means not shown in the drawing. These 5 segments have a total width represented by distance A. Rays 101 and 103 are shown to reflect off of reflective means 24, having originated from other areas of the device. In addition, these reflective means 24 provide an area where additional generators 93, 94, and 96 and their associated supports 43, 44, and 46 can be placed. Generators 90, 91, 98, and 99 and their associated supports 40, 41, 48, and 49 are similarly "hidden" off to the side of the outermost rays 100 and 104. Thus, the distance from reflective means to generators can be decreased by choosing the proper position for the elements of the tessellator. Note that generators 92, 95, and 97 can not be placed closer to reflective means 24 than shown because doing so would force supporting structures 41 and 48 to move and therefore block rays produced by generators 92, 93, 96, or 97. (All path lengths from the generators to the focusing means must be kept constant in order for the objects to be properly in focus.)

Note that, in FIG. 14, the generators are placed off center within their respective supporting structures. Note also that, if necessary, it is possible to increase the dimensions of one side of each of the supporting structures to varying degrees.

Figure 15:
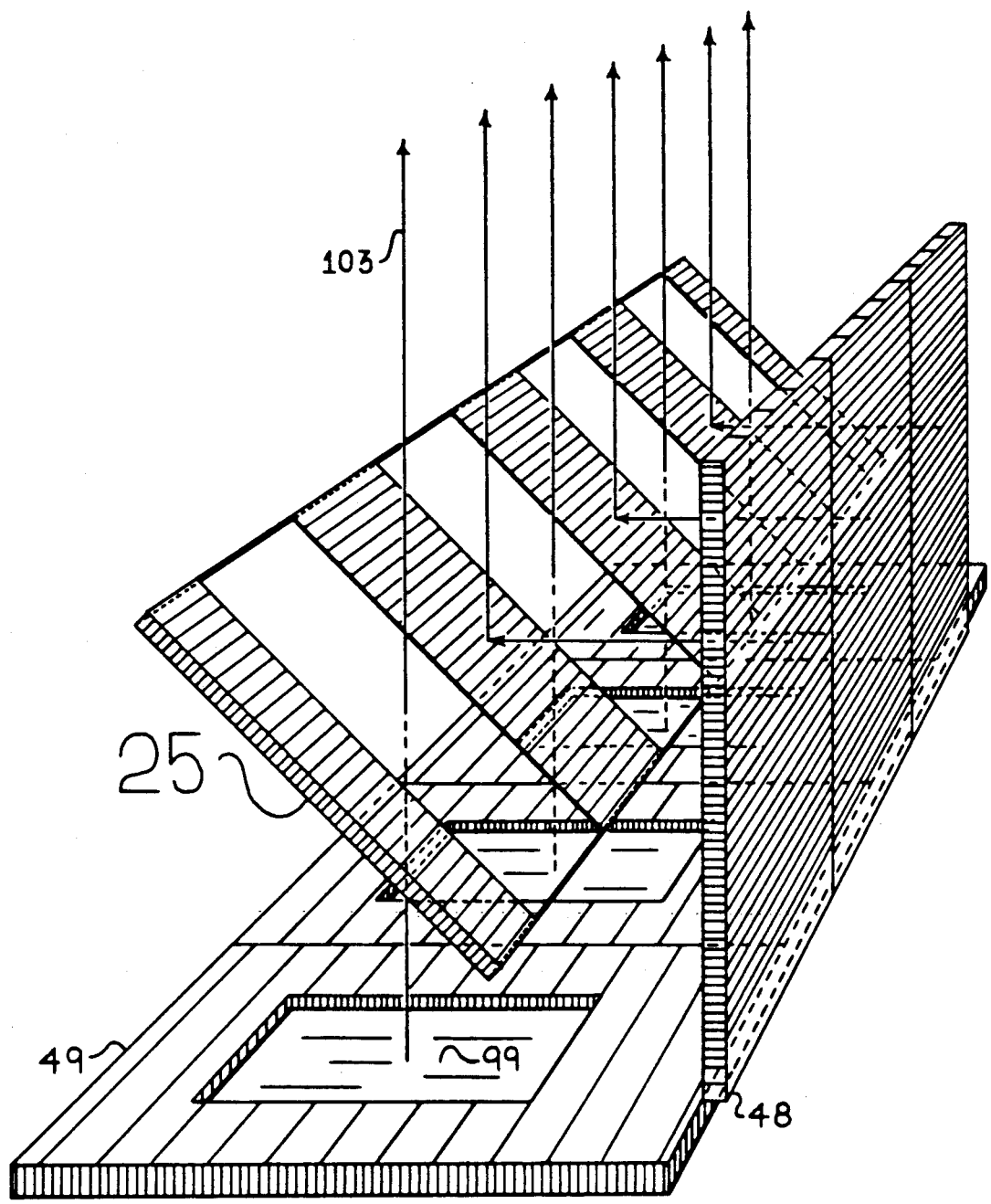
FIG. 15 is a perspective drawing of a T1 component.

The device of FIG. 14 is actually a 5×N, two-dimensional projecting tessellator, where N can be any arbitrary integer greater than one. FIG. 15 is a perspective drawing showing the essentials of the hidden dimension of the structure at the bottom of FIG. 14 which includes generators 98 and 99. Although FIG. 15 shows a device with N = 7, it should be clear that arbitrary integral values of N greater than one can be supported.

FIG. 15 depicts a Type 1 Tessellator Component. This component is also referred to as a T1 component. The object marked as 25 is a T1 reflective means. It is composed of a plurality of alternating clear and reflective means which are placed adjacent to each other, have a similar orientation, and are arranged in a linear pattern within a single plane. The clear means might be either transparent substances or spaces where no material is present. Object 25 is referred to as a "T1 reflective means" even though it is understood that only some parts are reflective. In FIG. 15, the edge of the T1 reflective means marked with reference numeral "25" corresponds to the visible edge of a similar component at the bottom of FIG. 14.

FIG. 15 is called a "7 element T1 component" or a "T1 component of length 7" because it contains 7 generators. In general, T1 components are useful in designing two-dimensional tessellators, since the length along which they can image can be increased arbitrarily by simply adding generators and extending the T1 reflective means with additional clear and reflective means. Observe that in FIG. 15, some sides of supporting structure 49 are limited by adjacent generator supporting structures or the possible extensions of non-adjacent generator supporting structures such as those of supporting structure 48. Other sides can be extended more freely.

Although FIG. 14 shows a 5×N device, it should be clear how to construct M×N devices for values of M from 1 through 4, as well. For example, using only that part of the design associated with rays 102 and 103, we can create a 2×N device. In this case, we can improve the resolution by moving the T1 components closer to the reflective means 24 associated with ray 103. Similarly, we can create a 3×N device using the parts of FIG. 14 associated with rays 101, 102, and 103. Again, resolution can be improved by moving the generators closer to the reflective means 24.

CONCLUSION, RAMIFICATIONS, AND SCOPE OF INVENTION

The previous section describes how to construct a projecting tessellator which allows many small components to be used in place of a single large one. The designs presented are simple, inexpensive, easy to manufacture, and easy to align. It is further shown how "one-dimensional" tessellation can be effected using simple mirrors (FIG. 2), "two-dimensional" tessellation can be effected using glass with mirrored sections (FIG. 9), extensions easily support an arbitrary number of segments (FIGS. 7, 8, 9, 14, and 15), many of the generating elements can be placed on the same plane (FIGS. 7, 8, 9, 14, and 15).

While the previous descriptions contain many specifications, these should not be construed as limitations on the scope of the invention, but rather as exemplifications of several preferred embodiments thereof. Many additional variations are possible. For example, the reflective means can be arranged to accommodate generating devices whose supporting structure is many times the size of the generators themselves. A device can be built to tessellate waves of other than electromagnetic radiation. For example, a speaker system can be created by using small speakers as generators and using a parabolic reflector as the focusing means. Accordingly, the scope of the invention should be determined not by the embodiments illustrated, but by the appended claims and their legal equivalents.

For convenience, the following definitions are given:

Definition: A tessellator is a device which creates or separates an image formed by electromagnetic radiation, sound, or similar waves from or into a plurality of separate image sub-sections. Such sub-sections are called segments or tiles. It differs from a beam splitter which does not treat electromagnetic radiation as an image forming medium. It differs from a machine that assembles porcelain tiles into a mosaic because the image formed by such a machine is not created from waves or wavelike particles.

Definition: Source elements are means of generating electromagnetic waves. In a generating tessellator, such source elements are configured in such a way as to produce image segments that will ultimately be used to form an entire image. Examples of generating means include cathode ray tubes, liquid crystal displays, and photographic negatives in combination with a light source.

Definition: The minimum tessellating distance of a specific projecting tessellator with given focal length, effective aperture, reflective means form and structure, and source means form, structure, and number, is the distance beyond which a reflective means, or portions thereof, must be placed from the central optical plane of the focusing means in order that there be at least one individual source means that generates less than the entire area of the object, this being the result of the position of the area. In practice, most tessellator designs place the reflective means as far from the focusing means as possible in order to obtain maximum resolution from the system.

Definition: Overlapping sources are source pairs so positioned that parts of both sources generate some identical part of the object being generated by a tessellator. The tessellator combines these sub-sections of common image areas in the process of forming a complete image. This requires each point of the sub-sections with common areas to be of the appropriate intensity for the design of the tessellator to be used to form the image.

Definition: A tessellated object intensity dropoff area is a part of the object which could be generated, but is not necessarily generated, by overlapping sources for some specific tessellator design and for a specific object placed at a specific position and distance from the focusing means of said tessellator. As long as at least one source generates every part of the image, including the intensity drop-off areas, it is at least theoretically possible to properly generate the image without intensity distortion. If only one source generates an overlapping area, then knowledge about the intensity drop-off function for the given tessellator would be used. Such a design generally trades off a decreased intensity range for overlapping sources to generate sub-sections at the intensity required if no reflective means were present. With such a design, the tradeoff of intensity for resolution does not have to be made.

Definition: A T1 reflective means is a plurality of alternating clear and reflective means which are placed adjacent to each other in a linear pattern. Usually all of the clear and reflective means are arranged in a similar orientation within a single plane. The clear means may be either transparent material or simply an area where no material is present.

Definition: A Type 1 Tessellator Component (also called a T1 component) of a generating tessellator consists of a T1 reflective means which directs rays from two sets of sources. All of the members of each said set of sources are arranged linearly and usually within the same orientation on a common plane. Usually the planes on which the sources lie are arranged perpendicular to each other.

Definition: The length of a T1 reflective means of a T1 component is the number of sources services by said T1 component's T1 reflective means.

Definition: The length of a T1 component is the length of its T1 reflective means.

I claim:

1. A tessellator comprising
    (a) a focusing means used to form a set of electromagnetic waves into a clear image,
    (b) a plurality of source elements, each of which generates a segment of said clear image,
    (c) at least one reflective means positioned along the path taken by the electromagnetic waves as they travel from said source elements to said focusing means, said reflective means positioned farther from said focusing means than a minimum tessellating distance to direct at least one section of said electromagnetic waves from at least one of said individual source elements to said focusing means.

2. A tessellator as described in claim 1 further comprising a plurality of reflective means, positioned farther from said focusing means than a minimum tessellating distance and divided into two non-empty sets denoted as a first reflective set and a second reflective set, wherein said plurality of reflective means are positioned along the path taken by the electromagnetic waves as they travel from said source elements to said focusing means and are positioned in such a way that one section of said electromagnetic waves travels directly from one of said sources to said focusing means, and wherein a second section of said electromagnetic waves travels from a second of said sources to one of said reflective means of said first reflective set and travels from said one of said reflective means of said first reflective set to said focusing means and wherein a third section of said electromagnetic waves travels from a third of said sources to a second of said reflective means of said first reflective set, and travels from said second of said reflective means of said first reflective set to one of said reflective means of said second reflective set and travels from said one of said reflective means of said second reflective set to said focusing means.

3. A tessellator as described in claim 2 wherein said reflective means from said first set are divided into two subsets denoted first subset and second subset, and wherein the reflective surface of all said reflective means of said first subset are coplanar and the reflective surface of all said reflective means of said second subset are coplanar and the said reflective surface of every said reflective means of said first subset is perpendicular to the said reflective surface of every said reflective means of said second subset and wherein the reflective surface of every said reflective means from said second set of said reflective means is coplanar with the said reflective surface of every said reflective means of said second subset.

4. A tessellator as described in claim 3 in combination with a tessellated object intensity dropoff area compensation means.

5. A tessellator as described in claim 2 in combination with a tessellated object intensity dropoff area compensation means.

6. A tessellator as described in claim 1 wherein at least one clear means and at least one of said reflective means are placed adjacent to each other in a linear arrangement, each of said clear means that is not the last of said linear arrangement followed by one of said reflective means and each of said reflective means that is not the last of said linear arrangement followed by one of said clear means.

7. A tessellator as described in claim 1 in combination with a tessellated object intensity dropoff area compensation means.

8. A tessellator as described in claim 7 wherein a section of said electromagnetic waves passes through a transparent material adjacent to said reflective means, said transparent material extending beyond the area of said reflective means whereby said section of said electromagnetic waves may pass through said extension and whereby image distortion is decreased over that if said extension had not been made.

9. A tessellator as described in claim 1 wherein a section of said electromagnetic waves passes through a transparent material adjacent to said reflective means, said transparent material extending beyond the area of said reflective means whereby said section of said electromagnetic waves may pass through said extension and whereby image distortion is decreased over that if said extension had not been made.

10. A tessellator as described in claim 1 wherein one of said reflective means is denoted primary reflective means and wherein from the set of said reflective means less said primary reflective means, are selected two non-intersecting, non-null subsets denoted first reflective means subset and second reflective means subset and wherein from all clear means are selected two non-intersecting, non-null subsets denoted first clear means subset and second clear means subset and wherein a set denoted first combined means of the union of said first reflective means subset and said first clear means subset, all the elements of said first combined means placed in a linear arrangement, each element of said first clear means subset that is not the least of said linear arrangement of said elements of said first combined means is followed by an element of said first reflective means subset and each element of said first reflective means subset that is not the last of said linear arrangement of said elements of said first combined means is followed by an element of said first clear means subset, and wherein a set denoted second combined means of the union of said second reflective means subset and said second clear means subset, all the elements of said second combined means placed in a linear arrangement, each element of said second clear means subset that is not the last of said linear arrangement of said elements of said second combined means is followed by an element of said second reflective means subset and each element of said second reflective means subset that is not the last of said linear arrangement of said elements of said second combined means is followed by an element of said second clear means subset, and wherein said primary reflective means is arranged in such a position between said focusing means and said first combined means so that a section of said electromagnetic waves from a set of said source means traveling to said first reflective means subset is further directed by said primary reflective means to said focusing means and so that a second section of said electromagnetic waves from a second set of said source means traveling to said first clear means subset is further directed by said primary reflective means to said focusing means.

* * * * *